US006625416B1

(12) United States Patent
Badesha et al.

(10) Patent No.: US 6,625,416 B1

(45) **Date of Patent: *Sep. 23, 2003**

(54) TRANSFIX COMPONENT HAVING HALOELASTOMER OUTER LAYER

(75) Inventors: Santokh S. Badesha, Pittsford, NY (US); Edward L. Schlueter, Jr., Rochester, NY (US)

(73) Assignee: Xerox Corporation, Stamford, CT (US)

( * ) Notice: Subject to any disclaimer, the term of this patent is extended or adjusted under 35 U.S.C. 154(b) by 201 days.

This patent is subject to a terminal disclaimer.

(21) Appl. No.: 09/698,730

(22) Filed: Oct. 27, 2000

(51) Int. Cl.[7] ........................ G03G 15/20; B32B 25/02; B32B 25/04; B32B 25/10; B32B 25/20

(52) U.S. Cl. ........................ 399/308; 428/421; 428/447; 428/448; 442/289; 442/293; 442/397; 442/399; 430/126; 399/333

(58) Field of Search ........................... 492/56; 428/35.8, 428/36.8, 36.91, 36.1, 448, 421, 422, 447, 906; 442/289, 293, 397, 399; 399/307, 309, 299, 308, 333; 430/126

(56) References Cited

U.S. PATENT DOCUMENTS

| | | | | |
|---|---|---|---|---|
| 5,132,743 A | | 7/1992 | Bujese et al. | 355/274 |
| 5,166,031 A | | 11/1992 | Badesha et al. | 430/124 |
| 5,281,506 A | | 1/1994 | Badesha et al. | 430/124 |
| 5,337,129 A | | 8/1994 | Badesha | 355/275 |
| 5,340,679 A | | 8/1994 | Badesha et al. | 430/126 |
| 5,361,126 A | | 11/1994 | Loonen et al. | 355/279 |
| 5,366,772 A | | 11/1994 | Badesha et al. | 525/104 |
| 5,370,931 A | | 12/1994 | Fratangelo et al. | 428/334 |
| 5,480,938 A | | 1/1996 | Badesha et al. | 525/104 |
| 5,500,298 A | | 3/1996 | Badesha | 428/411.1 |
| 5,500,299 A | | 3/1996 | Badesha | 428/447 |
| 5,537,194 A | | 7/1996 | Henry et al. | 355/271 |
| 5,576,818 A | | 11/1996 | Badesha et al. | 355/271 |
| 5,750,204 A | | 5/1998 | Badesha et al. | 427/387 |
| 5,753,307 A | | 5/1998 | Badesha et al. | 427/387 |
| 5,851,592 A | * | 12/1998 | Le Riche et al. | 427/350 |
| 6,002,910 A | * | 12/1999 | Eddy et al. | 399/330 |
| 6,434,355 B1 | * | 8/2002 | Badesha et al. | 399/307 |

* cited by examiner

*Primary Examiner*—Ramsey Zacharia
(74) *Attorney, Agent, or Firm*—Annette L Bade

(57) ABSTRACT

A transfix member with a substrate, an optional intermediate layer, and thereover an outer coating having a haloelastomer consisting essentially of monomers selected from the group consisting of halogenated monomers, polyorganosiloxane monomers, and mixtures thereof, and a heating member associated with substrate.

20 Claims, 2 Drawing Sheets

TRANSFIX COMPONENT HAVING HALOELASTOMER OUTER LAYER

BACKGROUND OF THE INVENTION

The present invention relates generally to an imaging apparatus and layers for components thereof, and for use in electrostatographic, including digital, apparatuses. The layers herein are useful for many purposes including layers for transfix films or transfuse films, and the like. More specifically, the present invention relates to layers comprising a haloelastomer and optional conductive filler. In specific embodiments, the haloelastomer consists essentially of monomers selected from the group consisting of halogenated monomers, polyorganosiloxane monomers, and mixtures thereof. The layers of the present invention may be useful in films used in xerographic machines, especially color machines.

In a typical electrostatographic reproducing apparatus such as electrophotographic imaging system using a photoreceptor, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

The developed toner image recorded on the imaging member can be transferred to an image receiving substrate such as paper via an intermediate transfer member. Alternatively, the developed image can be transferred to an intermediate transfer member from the image receiving member via another transfer member. The toner particles may be transferred by heat and/or pressure to an intermediate transfer member, or more commonly, the toner image particles may be electrostatically transferred to the intermediate transfer member by means of an electrical potential between the imaging member and the intermediate transfer member. After the toner has been transferred to the intermediate transfer member, it can then be transferred to the image receiving substrate, for example by contacting the substrate with the toner image on the intermediate transfer member under heat and/or pressure. Alternatively, the developed image can be transferred to another intermediate transfer member such as a transfix or transfer member. A transfix or transfuse member uses heat associated with the transfer member in order to both transfer and fix or fuse the developed image to a copy substrate.

Intermediate transfer members, including transfix or transfuse members, enable high throughput at modest process speeds. In four-color photocopier systems, the transfer member also improves registration of the final color toner image. In such systems, the four component colors of cyan, yellow, magenta and black may be synchronously developed onto one or more imaging, members and transferred in registration onto a transfer member at a transfer station.

In electrostatographic printing machines in which the toner image is transferred from the transfix member to the image receiving or copy substrate, it is important that the transfer of the toner particles from the transfix member to the image receiving substrate be substantially 100 percent. Less than complete transfer to the image receiving substrate results in image degradation and low resolution. Completely efficient transfer is particularly important when the imaging process involves generating full color images since undesirable color deterioration in the final colors can occur when the color images are not completely transferred from the transfer member.

Thus, it is important that the transfix member surface has excellent release characteristics with respect to the toner particles. Conventional materials known in the art for use as transfix members often possess the strength, conformability and electrical conductivity necessary for use as transfix members, but can suffer from poor toner release characteristics, especially with respect to higher gloss image receiving substrates. When heat is associated with a transfer member, such as in the case of a transfix member, the transfix member must also possess good thermal conductivity in addition to superior release characteristics. Also, there is a need for mechanical strength for wear resistance. A transfix member undergoes multiple cycling during use.

In addition, in the event that electrically conductive fillers are needed to build electrical and thermal conductivities, and/or mechanical strength, it is necessary that the fillers be compatible with the materials used in the transfix member. Similarly, if release fluids are used, the materials in the transfix member and the fillers, if used, must be compatible with the release fluid materials. Also, the fillers, if used, and the materials in the transfix members must be chemically compatible with toners or liquid developers used in the electrostatographic apparatus.

U.S. Pat. No. 5,361,126 discloses an imaging apparatus including a transfer member including a heater and pressure-applying roller, wherein the transfer member includes a fabric substrate and an impurity-absorbent material as a top layer. The impurity-absorbing material can include a rubber elastomer material.

U.S. Pat. No. 5,337,129 discloses an intermediate transfer component comprising a substrate and a ceramer or grafted ceramer coating comprised of integral, interpenetrating networks of haloelastomer, silicon oxide, and optionally polyorganosiloxane.

U.S. Pat. No. 5,340,679 discloses an intermediate transfer component comprised of a substrate and thereover a coating comprised of a volume grafted elastomer, which is a substantially uniform integral interpenetrating network of a hybrid composition of a fluoroelastomer and a polyorganosiloxane.

U.S. Pat. No. 5,480,938 describes a low surface energy material comprising a volume grafted elastomer which is a substantially uniform integral interpenetrating network of a hybrid composition of a fluoroelastomer and a polyorganosiloxane, the volume graft having been formed by dehydrofluorination of fluoroelastomer by a nucleophilic dehydrofluorinating agent, followed by a hydrosilation reaction, addition of a hydrogen functionally terminated polyorganosiloxane and a hydrosilation reaction catalyst U.S. Pat. No. 5,366,772 describes a fuser member comprising a supporting substrate, and a outer layer comprised of an integral interpenetrating hybrid polymeric network comprised of a haloelastomer, a coupling agent, a functional polyorganosiloxane and a crosslinking agent.

U.S. Pat. No. 5,456,987 discloses an intermediate transfer component comprising a substrate and a titamer or grafted titamer coating comprised of integral, interpenetrating networks of haloelastomer, titanium dioxide, and optionally polyorganosiloxane.

U.S. Pat. No. 5,848,327 discloses an electrode member positioned near the donor member used in hybrid scavengeless development, wherein the electrode members have a composite haloelastomer coating.

U.S. Pat. No. 5,576,818 discloses an intermediate toner transfer component including: (a) an electrically conductive substrate; (b) a conformable and electrically resistive layer comprised of a first polymeric material; and (c) a toner release layer comprised of a second polymeric material selected from the group consisting of a fluorosilicone and a substantially uniform integral interpenetrating network of a hybrid composition of a fluoroelastomer and a polyorganosiloxane, wherein the resistive layer is disposed between the substrate and the release layer.

U.S. Pat. No. 6,037,092 discloses a fuser member comprising a substrate and at least one layer thereover, the layer comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

U.S. Pat. No. 5,537,194 discloses an intermediate toner transfer member comprising: (a) a substrate; and (b) an outer layer comprised of a haloelastomer having pendant hydrocarbon chains covalently bonded to the backbone of the haloelastomer.

U.S. Pat. No. 5,753,307 discloses fluoroelastomer surfaces and a method for providing a fluoroelastomer surface on a supporting substrate which includes dissolving a fluoroelastomer; adding a dehydrofluorinating agent; adding an amino silane to form a resulting homogeneous fluoroelastomer solution; and subsequently providing at least one layer of the homogeneous fluoroelastomer solution to the supporting substrate.

U.S. Pat. No. 5,840,796 describes polymer nanocomposites including a mica-type layered silicate and a fluoroelastomer, wherein the nanocomposite has a structure selected from the group consisting of an exfoliated structure and an intercalated structure.

U.S. Pat. No. 5,846,643 describes a fuser member for use in an electrostatographic printing machine, wherein the fuser member has at least one layer of an elastomer composition comprising a silicone elastomer and a mica-type layered silicate, the silicone elastomer and mica-type layered silicate form a delaminated nanocomposite with silicone elastomer inserted among the delaminated layers of the mica-type layered silicate.

Therefore, it is desired to provide a transfix member that possesses the qualities of conformability for copy quality and latitude, and also being tough for wear resistance. It is also desired to provide a transfer member that is electrically conductive to enable electrostatically assisted transfer. It is further desired to provide a transfer member that has low surface energy for release capability, and is chemically resistant to toner ingredients and release agents to enable efficient toner transfer. A further desired characteristic is for a transfer member to have a reduced susceptibility to swelling in the presence of release oils. An additional desired property for a transfix or transfuse member having heat associated therewith, is for the transfix member to be thermally stable for conduction for fusing or fixing.

SUMMARY OF THE INVENTION

The present invention provides, in embodiments: an image forming apparatus for forming images on a recording medium comprising: a) a charge-retentive surface to receive an electrostatic latent image thereon; b) a development component to apply a developer material to the charge-retentive surface to develop the electrostatic latent image to form a developed image on the charge-retentive surface; c) a transfer component for transferring the developed image from the charge-retentive surface to an intermediate transfer component; d) an intermediate transfer component for receiving the developed image from the transfer component and transferring the developed image to a transfix component; and e) a transfix component to transfer the developed image from the intermediate transfer component to a copy substrate and to fix the developed image to the copy substrate, the transfix component comprising: i) a transfix substrate, and thereover ii) an outer coating comprising a haloelastomer consisting essentially of monomers selected from the group consisting of halogenated monomers, polyorganosiloxane monomers, and mixtures thereof, and iii) a heating member associated with the transfix substrate.

The present invention further provides, in embodiments: a transfix member comprising: a) a transfix substrate, and thereover b)an outer coating to comprising a haloelastomer consisting essentially of monomers selected from the group consisting of halogenated monomers, polyorganosiloxane monomers, and mixtures thereof, and c) a heating member associated with the transfix substrate.

In addition, the present invention provides, in embodiments: an image is forming apparatus for forming images on a recording medium comprising: a) a charge-retentive surface to receive an electrostatic latent image thereon; b) a development component to apply a developer material to the charge-retentive surface to develop the electrostatic latent image to form a developed image on the charge-retentive surface; c) a transfer component for transferring the developed image from the charge-retentive surface to an intermediate transfer component; d) an intermediate transfer component for receiving the developed image from the transfer component and transferring the developed image to a transfix component; and e) a transfix component to transfer the developed image from the intermediate transfer component to a copy substrate and to fix the developed image to the copy substrate, the transfix component comprising: i) a transfix substrate comprising a material selected from the group consisting of fabric and metal, and thereover ii) an outer coating comprising a haloelastomer consisting essentially of monomers selected from the group consisting of halogenated monomers, polyorganosiloxane monomers, and mixtures thereof, and iii) a heating member associated with the transfix substrate.

BRIEF DESCRIPTION OF THE DRAWINGS

The above embodiments of the present invention will become apparent as the following description proceeds upon reference to the drawings, which include the following figures.

DETAILED DESCRIPTION OF THE INVENTION

The present invention is directed to transfix members having layers. The transfix members can be film components including films, sheets, belts and the like, useful in electrostatographic, including digital, apparatuses. In one embodiment of the present invention, a transfix member comprises a substrate and an outer layer comprising a haloelastomer and optional electrically conductive fillers. In an alternative embodiment, a transfix member comprises a substrate, intermediate layer, and outer layer comprising a haloelastomer and optional electrically conductive fillers.

Figure 1:
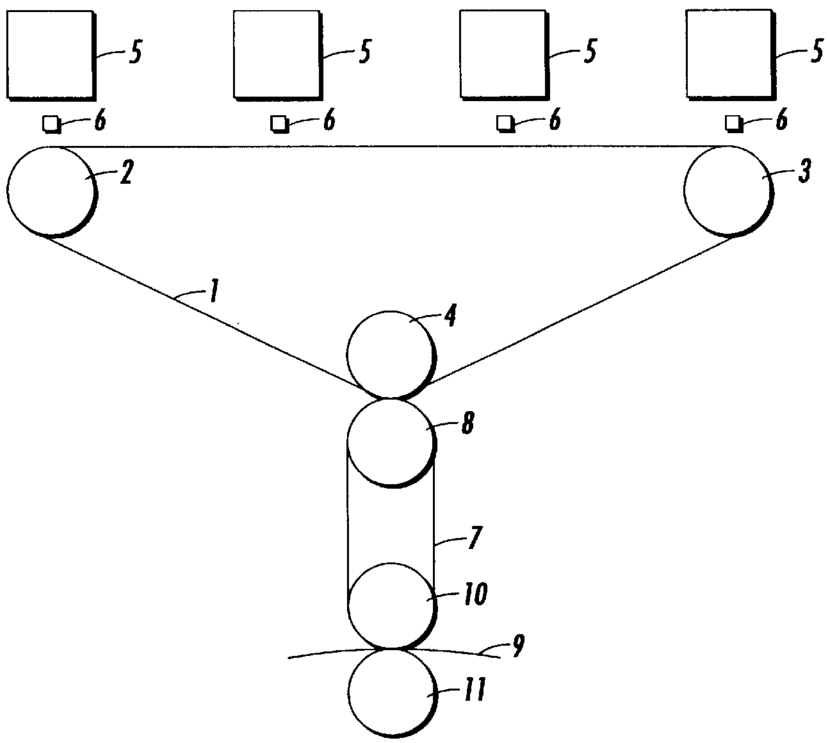
FIG. 1 is an illustration of a general electrostatographic apparatus using a transfix member.

Referring to FIG. 1, there is depicted an image-forming apparatus comprising intermediate transfer member 1 advanced by rollers 2, 3 and 4. Intermediate transfer member 1 is depicted as a belt or film member, but may be of another useful form such as a belt, sheet, film, drum, roller or the like. An image is processed and developed by image processing units 5. There may be as few as 1 processing unit, for example, for 1 color processing such as black, and as many processing units as desired. In embodiments, each processing unit processes a specific color. In preferred embodiments, there are 4 processing units for processing cyan, black, yellow and magenta. The first processing unit processes one color and transfers this developed one-color image to the intermediate transfer member 1 via transfer member 6. The intermediate transfer member 1 is advanced to the next relevant processing unit 5 and the process is repeated until a fully developed image is present on the intermediate transfer member 1.

After the necessary number of images are developed by image processing members 5 and transferred to intermediate transfer member 1 via transfer members 6, the fully developed image is transferred to transfix. member 7. The transfer of the developed image to transfix member 7 is assisted by rollers 4 and 8, either or both of which may be a pressure roller or IS a roller having heat associated therewith. In a preferred embodiment, one of 4 roller or 8 roller is a pressure member, wherein the other roller 4 or 8 is a heated roller. Heat may be applied internal or external to the roller. Heat may be supplied by any known heat source.

In a preferred embodiment, the fully developed image is subsequently transferred to a copy substrate 9 from transfix member 7. Copy substrate 9, such as paper, is passed between rollers 10 and 11, wherein the developed image is transferred and fused to the copy substrate by transfix member 7 via rollers 10 and 11. Rollers 10 and/or 11 may or may not contain heat associated therewith. In a preferred embodiment, one of rollers 10 and 11 contains heat associated therewith in order to transfer and fuser the developed image to the copy substrate. Any form of known heat source may be associated with roller 10 and/or 11.

Figure 2:
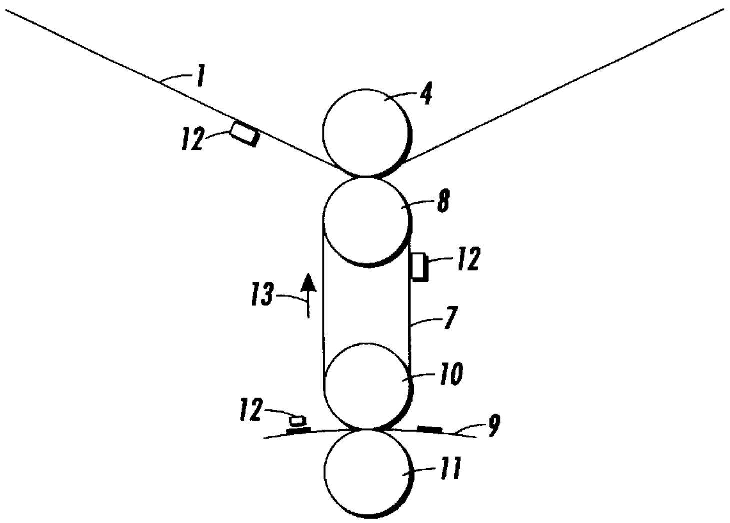
FIG. 2 is an enlarged view of an embodiment of a transfix system.

FIG. 2 demonstrates an enlarged view of a preferred embodiment of a transfix member 7 which may be in the form of a belt, sheet, film, roller, or like form. The developed image 12 positioned on intermediate transfer member 1, is brought into contact with and transferred to transfix member 7 via rollers 4 and 8. As set forth above, roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

Figure 3:
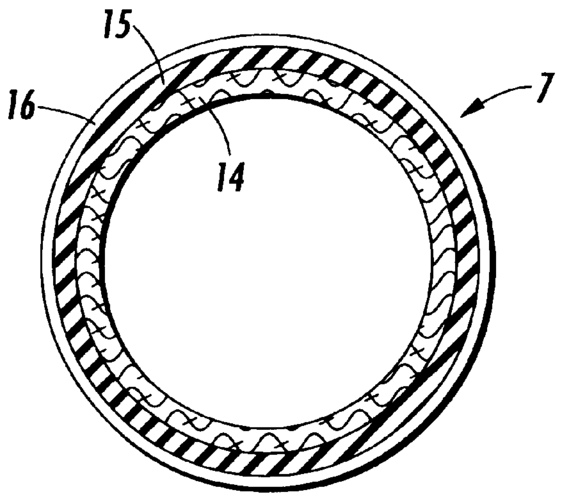
FIG. 3 is an enlarged view of an embodiment of a transfix belt configuration involving a substrate, an intermediate layer, and thin outer layer.

FIG. 3 demonstrates a preferred embodiment of the invention, wherein transfix member 7 comprises substrate 14, having thereover intermediate layer 15. Outer layer 16 is positioned on the intermediate layer 15. Substrate 14, in preferred embodiments, comprises metal or fabric. In a preferred embodiment, the substrate comprises a fabric material,the intermediate layer 15 is an elastic layer, and the outer layer 16 is a thin overcoat. In another preferred embodiment, the substrate 14 comprises a metal, the intermediate layer 15 is a thin layer, and the outer layer 16 is a thin overcoat.

Figure 4:
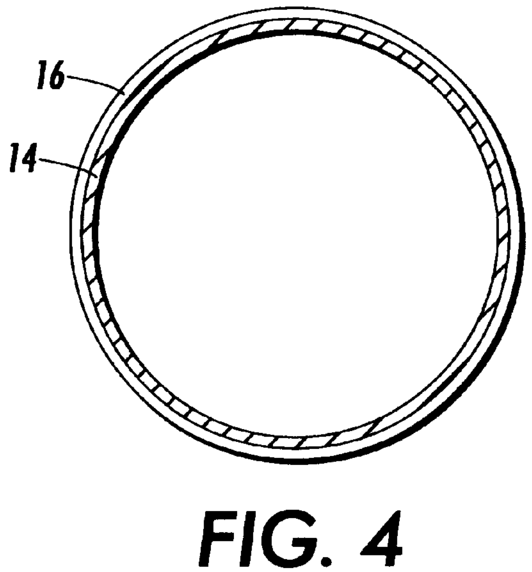
FIG. 4 is an enlarged view of an embodiment of a transfix belt configuration having a substrate and thin outer layer.

FIG. 4 depicts another preferred embodiment of the invention. FIG. 4 depicts a two-layer configuration comprising a substrate 14 and outer layer 16 positioned on the substrate 14. In a preferred embodiment, the substrate 314 comprises a metal, and positioned thereon; a thin overcoat for the outer layer 16.

The transfix outer layer(s) herein comprise a haloelastomer. Preferred haloelastomers include haloelastomers comprising halogen monomers, haloelastomers comprising polyorganosiloxanes, and haloelastomers comprising halogen monomers and polyorganosiloxane monomers. A particularly preferred haloelastomer comprises only halogenated monomers.

Examples of haloelastomers comprising halogen monomers include fluoroelastomers comprising copolymers and terpolymers of vinylidenefluoride, hexafluoropropylene and tetrafluoroethylene, which are known commercially under various designations as VITON A®, VITON E®, VITON E60C®, VITON E45®, VITON E430®, VITON B 910®, VITON GH®, VITON B50®, VITON E45®, and VITON GF®. The VITON® designation is a Trademark of E.I. DuPont de Nemours, Inc. Two preferred known fluoroelastomers are (1) a class of copolymers of vinylidenefluoride, hexafluoropropylene and tetrafluoroethylene, known commercially as VITON A®, (2) a class of terpolymers of vinylidenefluoride, hexafluoropropylene and tetrafluoroethylene known commercially as VITON B®, and (3) a class of tetrapolymers of vinylidenefluoride, hexafluoropropylene, tetrafluoroethylene and a cure site monomer, for example, VITON® GF. VITON A®, and VITON B®, and other VITON® designations are trademarks of E.I. DuPont de Nemours and Company.

In another preferred embodiment, the fluoroelastomer is a tetrapolymer having a relatively low quantity of vinylidenefluoride. An example is VITON GF®, available from E.I. DuPont de Nemours, Inc. The VITON GF® has 35 weight percent of vinylidenefluoride, 34 weight percent of hexafluoropropylene and 29 weight percent of tetrafluoroethylene with 2 weight percent cure site monomer. The cure site monomer can be those available from DuPont such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomer.

Other preferred haloelastomers include haloelastomers comprising polyorganosiloxane monomers, and haloelastomers comprising halogen monomers and polyorganosiloxane monomers, such as polymer composites including, for example, volume grafted elastomers, titamers, grafted titamers, ceramers, and grafted ceramers.

In one embodiment of the invention, the haloelastomer is a volume grafted elastomer. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator.

Volume graft, in embodiments, refers to a substantially uniform integral interpenetrating network of a hybrid composition, wherein both the structure and the composition of the fluoroelastomer and polyorganosiloxane are substantially uniform when taken through different slices of the layer. A volume grafted elastomer is a hybrid composition of fluoroelastomer and polyorganosiloxane formed by dehydrofluorination of fluoroelastomer by nucleophilic dehydrofluorinating agent followed by addition polymerization by the addition of alkene or alkyne functionally terminated polyorganosiloxane. Examples of specific volume graft elastomers are disclosed in U.S. Pat. No. 5,166,031; U.S. Pat. No. 5,281,506; U.S. Pat. No. 5,366,772; and U.S. Pat. No. 5,370,931, the disclosures of which are herein incorporated by reference in their entirety.

In embodiments, the polyorganosiloxane has the formula I:

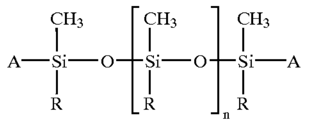

where R is an alkyl from about 1 to about 24 carbons, or an alkenyl of from about 2 to about 24 carbons, or a substituted or unsubstituted aryl of from about 4 to about 24 carbons; A is an aryl of from about 6 to about 24 carbons, a substituted or unsubstituted alkene of from about 2 to about 8 carbons, or a substituted or unsubstituted alkyne of from about 2 to about 8 carbons; and n is from about 2 to about 400, and preferably from about 10 to about 200 in embodiments.

In preferred embodiments, R is an alkyl, alkenyl or aryl, wherein the alkyl has from about 1 to about 24 carbons, preferably from about 1 to about 12 carbons; the alkenyl has from about 2 to about 24 carbons, preferably from about 2 to about 12 carbons; and the aryl has from about 4 to about 24 carbon atoms, preferably from about 6 to about 18 carbons. R may be a substituted aryl group, wherein the aryl may be substituted with an amino, hydroxy, mercapto or substituted with an alkyl having for example from about 1 to about 24 carbons and preferably from 1 to about 12 carbons, or substituted with an alkenyl having for example from about 2 to about 24 carbons and preferably from about 2 to about 12 carbons. In a preferred embodiment, R is independently selected from methyl, ethyl, and phenyl. The functional group A can be an alkene or alkyne group having from about 2 to about 8 carbon atoms, preferably from about 2 to about 4 carbons, optionally substituted with an alkyl having for example from about 1 to about 12 carbons, and preferably from about 1 to about 12 carbons; or an aryl group having for example from about 6 to about 24 carbons, and preferably from about 6 to about 18 carbons. Functional group A can also be mono-, di-, or trialkoxysilane having from about 1 to about 10 and preferably from about 1 to about 6 carbons in each alkoxy group, hydroxy, or halogen. Preferred alkoxy groups include methoxy, ethoxy, and the like. Preferred halogens include chlorine, bromine and fluorine. A may also be an alkyne of from about 2 to about 8 carbons, optionally substituted with an alkyl of from about 1 to about 24 carbons or aryl of from about 6 to about 24 carbons. The group n is from about 2 to about 400, and in embodiments from about 2 to about 350, and preferably from about 5 to about 100. Furthermore, in a preferred embodiment n is from about 60 to about 80 to provide a sufficient number of reactive groups to graft onto the fluoroelastomer. In the above formula, typical R groups include methyl, ethyl, propyl, octyl, vinyl, allylic crotnyl, phenyl, naphthyl and phenanthryl, and typical substituted aryl groups are substituted in the ortho, meta and para positions with lower alkyl groups having from about 1 to about 15 carbon atoms. Typical alkene and alkenyl functional groups include vinyl, acrylic, crotonic and acetenyl which may typically be substituted with methyl, propyl, butyl, benzyl, tolyl groups, and the like.

Ceramers are also preferred polymer composites useful as xerographic coatings herein. A ceramer generically refers to a hybrid material of organic and composite composition, which typically has ceramic-like properties. As used herein, the term ceramer refers to, in embodiments, a composite polymer comprised of substantially uniform integral interpenetrating networks of a haloelastomer and silicon oxide (tetraethoxy orthosilicate). The term grafted ceramer refers to, in embodiments, a composite polymer comprised of substantially uniform integral interpenetrating networks of a polyorganosiloxane grafted haloelastomer and silicon oxide network. In the grafted ceramer, the haloelastomer is the first monomer segment, the polyorganosiloxane is the third monomer segment and the second monomer segment is tetraethoxy orthosilicate, the intermediate to a silicon oxide network. Both the structure and the composition of the polyorganosiloxane grafted haloelastomer and silicon oxide networks are substantially uniform when viewed through different slices of the layer. The phrase interpenetrating network refers to the intertwining of the haloelastomer and silicon oxide network polymer strands for the ceramer, and to the intertwining of the polyorganosiloxane grafted haloelastomer and silicon oxide polymer network strands for the grafted ceramer. The phrase haloelastomer may be any suitable halogen containing elastomer such as a chloroelastomer, a bromoelastomer, or the like, mixtures thereof, and preferably is a fluoroelastomer. Examples of suitable fluoroelastomers are set forth above. Examples of suitable polyorganosiloxanes are referred to above. The phrases "silicon oxide," "silicon oxide network," "network of silicon oxide" and the like refer to alternating, covalently bound atoms of metal and oxygen, wherein alternating atoms of silicon and oxygen may exist in a linear, branched, and/or lattice pattern. The atoms of silicon and oxygen exist in a network and not as discrete particles. Preferred ceramers and grafted ceramers are described in U.S. Pat. No. 5,337,129, the disclosure of which is hereby incorporated by reference in its entirety.

In a preferred embodiment of the invention, the ceramer has the following formula II:

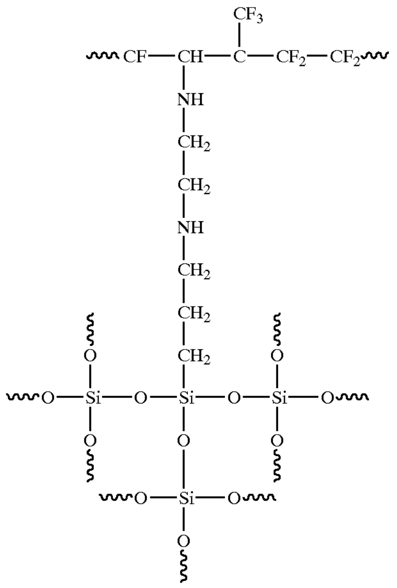

In the above formula, the symbol, "~" represents a continuation of the polymer network.

In a preferred embodiment of the invention, a grafted ceramer has the following formula III:

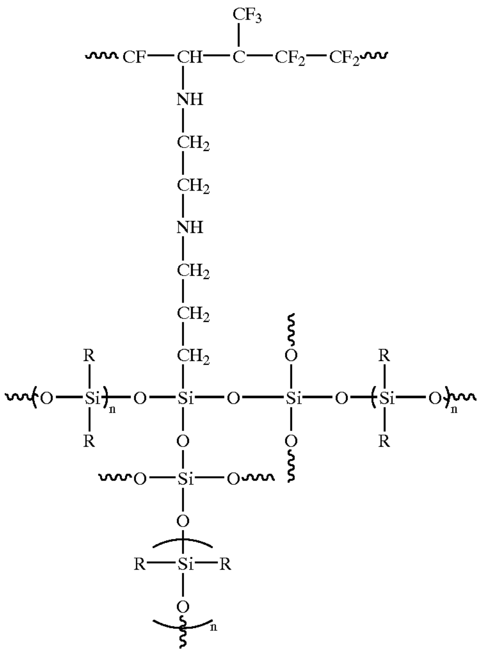

In the above formula, R is the R group of the polyorganosiloxane described above and maybe a substituent as defined herein for the R group of the polyorganosiloxane; is a number as herein defined for the n of the polyorganosiloxane above; and the symbol "~" represents a continuation of the polymer network.

Titamers are also preferred polymer composites suitable for the xerographic coatings herein. Titamers are discussed in U.S. Pat. Nos. 5,500,298; 5,500,299; and 5,456,987, the disclosures each of which are hereby incorporated by reference in their entireties. As used herein, the phrase titamer refers to a composite material comprised of substantially uniform integral interpenetrating networks of haloelastomer and titanium oxide network, wherein both the structure and the composition of the haloelastomer and titanium oxide network, are substantially uniform when viewed through different slices of the coating layer. The phrase grafted titamer refers to a substantially uniform integral interpenetrating networks of a polyorganosiloxane grafted haloelastomer and titanium oxide network, wherein the haloelastomer is the first monomer segment, the polyorganosiloxane is the third grafted monomer segment and titanium isobutoxide, the intermediate to titanium oxide network, is the second monomer segment. Both the structure and the composition of the polyorganosiloxane grafted haloelastomer and titanium oxide network are substantially uniform when viewed through different slices of the xerographic coating layer. The phrase interpenetrating network refers to the intertwining of the haloelastomer and titanium oxide network polymer strands for the titamer, and to the intertwining of the polyorganosiloxane grafted haloelastomer and titanium oxide network polymer strands for the grafted titamer. The phrase haloelastomer may be any suitable halogen containing elastomer such as a chloroelastomer, a bromoelastomer, or the like, mixtures thereof, and preferably is a fluoroelastomer as described above. The phrase "titanium oxide," network of titanium oxide," or "titanium oxide network" or similar phrases refers to alternating, covalently bound atoms of titanium and oxygen, wherein the alternating atoms of titanium and oxygen may exist in a linear, branched and/or lattice patter. The atom of titanium and oxygen exist in a network and not as discrete particles.

Examples of titamers include those having the following formula IV:

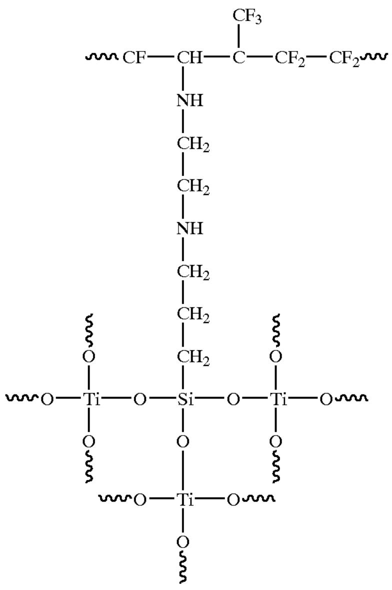

In the above formula, the symbol "~" represents the continuation of the polymeric network.

Examples of grafted titamers include those having the following formula V:

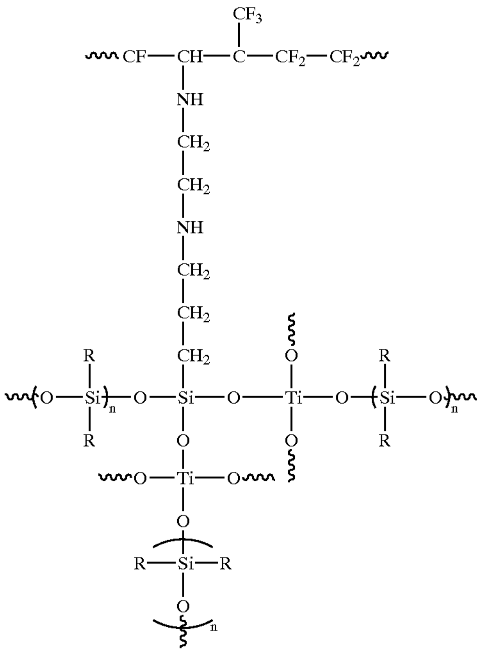

In the above formula; R is the R group of the polyorganosiloxane described above, and maybe a substituent as defined herein for the R group of the polyorganosiloxane; n is a number as herein defined for the n of the polyorganosiloxane above; and the symbol "~" represents a continuation of the polymer network.

Other preferred haloelastomers include fluoroelastomers such as fluorourethanes, fluoroacrylate such as LUMIFLON® available from ICI Americas, Inc., Wilmington, Del., and other fluoroelastomers such as polyvinyl fluoride such as TEDLAR®, polyvinylidiene fluoride such as KYNAR®, and the like.

In addition, preferred haloelastomers include those comprising polyorganosiloxane copolymers such as polyamide polyorganosiloxane copolymers, polyimide polyorganosiloxane copolymers, polyester polyorganosiloxane copolymers, polysulfone polyorganosiloxane copolymers, polystyrene polyorganosiloxane copolymers, polypropylene polyorganosiloxane copolymers, and polyester polyorganosiloxane copolymers.

The haloelastomer is present in the transfix layer in an amount of from about 95 to about 35 percent, preferably from about 90 to about 50 percent, and particularly preferred is from about 80 to about 70 percent by weight of total solids. Total solids as used herein refers to the total amount by weight of haloelastomer, doped metal oxide filler, and any additional additives, fillers or like solid materials.

The layers, in embodiments, may comprise electrically conductive particles dispersed therein. These electrical conductive particles decrease the material resistivity into the desired resistivity range. The desired surface resistivity is from about $10^6$ to about $10^{14}$, preferably from about $10^9$ to about $10^{13}$, and more preferably from about $10^{10}$ to about $10^{12}$ ohms/sq. The preferred volume resistivity range is from about $10^5$ to about $10^{14}$, preferably from about $10^8$ to about $10^{14}$, and particularly preferred is from about $10^{12}$ to about $10^{14}$ ohm-cm. The desired resistivity can be provided by varying the concentration of the conductive filler. It is important to have the resistivity within this desired range. The transfix components may exhibit undesirable effects if the resistivity is not within the required range. Other problems include resistivity that is susceptible to changes in temperature, relative humidity, and the like. The combination of haloelastomer and doped metal oxide filler, in embodiments, allows for tailoring of a desired resistivity, and further, allows for a stable resistivity virtually unaffected by changes in relative humidity and temperature.

Examples of conductive fillers include conventional electrically conductive fillers such as metals, metal oxides, carbon blacks, and conductive polymers such as polyanaline, polypyrroles, polythiophenes, and the like, and mixtures thereof. In a preferred embodiment of the invention, the electrically conductive filler is carbon black and/or indium tin oxide. The optional conductive filler is present in the layer in an amount of from about 1 to about 30 percent, preferably from about 2 to about 20 percent by weight of total solids in the layer.

It is preferred that the outer layer of the transfix member be relatively thin. Preferably, the thickness of the transfix member is from about 1 to about 10 mils, and preferably from about 2 to about 6 mils.

The substrate can comprise any material having suitable strength and flexibility for use as a transfix member, enabling the member to cycle around rollers during use of the machine. Preferred materials for the substrate include metals, rubbers and fabrics. Preferred metals include steel, aluminum, nickel, and their alloys, and like metals and alloys of like metals. Examples of suitable rubbers include ethylene propylene dienes, silicone rubbers, fluoroelastomers, n-butyl rubbers and the like.

A fabric material, as used herein, refers to a textile structure comprised of mechanically interlocked fibers or filaments, which, may be woven or nonwoven. Fabrics are materials made from fibers or threads and woven, knitted or pressed into a cloth or felt type structures. Woven, as used herein, refers to closely oriented by warp and filler strands at right angles to each other. Nonwoven, as used herein, refers to randomly integrated fibers or filaments. The fabric material should have high mechanical strength and possess electrical insulating properties.

Examples of suitable fabrics include woven or nonwoven cotton fabric, graphite fabric, fiberglass, woven or nonwoven polyimide (for example KELVAR® available from DuPont), woven or nonwoven polyamide, such as nylon or polyphenylene isophthalamide (for example, NOMEX® of E.I. DuPont of Wilmington, Del.), polyester, aramids, polycarbonate, polyacryl, polystyrene, polyethylene, polypropylene, cellulose, polysulfone, polyxylene, polyacetal, and the like, and mixtures thereof.

Preferably, the substrate is of a thickness of from about 20 to about 65 mils, and preferably from about 40 to about 60 mils.

In an optional embodiment, an intermediate layer may be positioned between the substrate and the outer layer. Materials suitable for use in the intermediate layer include silicone materials, fluoroelastomers, fluorosilicones, ethylene propylene diene rubbers, and the like. In a particularly preferred embodiment, the intermediate layer further comprises a thermal or electrically conductive filler. Suitable fillers include carbon black and a preferred example is fluorinated carbon such as ACCUFLUOR®, metals, metal oxides, doped metal oxides, and mixtures thereof. Preferred fillers are aluminum oxide, boron nitride, carbon black and zinc oxide. it is preferred that the intermediate layer be conformable and be of a thickness of from about 2 to about 60 mils and preferably from about 4 to about 25 mils.

Examples of suitable transfix members include a sheet, a film, a web, a foil, a strip, a coil, a cylinder, a drum, an endless strip, a circular disc, a belt including an endless belt, an endless seamed flexible belt, an endless seamless flexible belt, an endless belt having a puzzle cut seam, and the like. It is preferred that the substrate having the outer layer thereon, be an endless seamed flexible belt or seamed flexible belt, which may or may not include puzzle cut seams.

The transfix film, preferably in the form of a belt, has a width, for example, of from about 150 to about 2,000 mm, preferably from about 250 to about 1,400 mm, and particularly preferred is from about 300 to about 500 mm. The circumference of the belt is preferably from about 75 to about 2,500 mm, more preferably from about 125 to about 2,100 mm, and particularly preferred from about 155 to about 550 mm.

Specific embodiments of the invention will now be described in detail. These examples are intended to be illustrative, and the invention is not limited to the materials, conditions, or process parameters set forth in these embodiments. All parts are percentages by weight of total solids as defined above unless otherwise indicated.

EXAMPLES

Example 1

Preparation of VITON® B Fluoroelastomer Outer Layer

A belt was prepared having a substrate and only one overcoating. The overcoating was comprised of VITON® B50, a material available from E.I. DuPont and believed to be a fluoropolymer comprised of a terpolymer of vinylidene fluoride, hexafluoropropylene, and tetrafluoroethylene. A solution of VITON® B50 was prepared by dissolving about 500 grams of the B50 in about 5 liters of methylethyl ketone (MEK) and stirring at room temperature or about 25° C. To approximately 5 liters of this solution, there were added in a reaction vessel 4.4 grams of magnesium oxide, 2.2 grams of calcium hydroxide, 11 grams of E.I. DuPont Curative VC50, and 10 grams of carbon black N991 obtained from Vanderbilt Corporation. The contents of the vessel were ball milled with media for around 17 hours. The resulting black dispersion containing the VITON® B50 was then spray coated to a dry thickness of about 6 mils onto a stainless steel belt (thickness about 3 mils).

This belt was then incorporated into a two-belt, dry-development transfuse fixture. This fixture was modified to apply low levels of release fluids. The belt temperature was maintained at about 120° C. and amino functional polyorganosiloxane oil was used as release fluid. It was observed that approximately 95 to 98 percent of the toner was transferred from this belt to the paper. On repeated cycling, the toner transfer efficiency did not degrade indicating that this belt would have extended release life for a viable product.

Example 2

Preparation of VITON® GF Fluoroelastomer Outer Layer on Polyimide Substrate Another fluoroelastomer outer layer belt was prepared having a substrate and only one overcoating. The overcoating was comprised of VITON® GF, also available from E.I. DuPont and believed to be a fluoropolymer comprised of a terpolymer of vinylidene fluoride, hexafluoropropylene, and tetrafluoroethylene. A solution of VITON® GF was prepared by dissolving about 500 grams of the GF in about 5 liters of methylethyl ketone (MEK) and stirring at room temperature. To approximately liters of this solution, there were added in a reaction vessel 4.4 grams of magnesium oxide, 2.2 grams of calcium hydroxide, 11 grams of E.I. DuPont. Curative VC50, and 10 grams of carbon black N991 obtained from Vanderbilt Corporation. The contents of the vessel were ball milled with media for 17 hours. The resulting black dispersion containing the VITON® GF was then spray coated to a dry thickness of about 6 mils onto a 2 mil thick polyimide belt.

This belt was then incorporated into a two-belt, dry-development transfuse fixture. This fixture was modified to apply low levels of release fluids. The belt temperature was maintained at about 120° C. and amino functional polyorganosiloxane oil was used as release fluid. It was observed that about 95 to 98 percent of the toner was transferred from this belt to the paper. On repeated cycling, the toner transfer efficiency did not degrade indicating that this belt would have extended release life for a viable product.

Example 3

Preparation of Volume Graft Fluoroelastomer Outer Layer

A stainless steel belt (3 mils thick) was abraded with sand paper, followed by degreasing, scrubbing with an abrasive cleaner, and thoroughly washing with water. An epoxy primer THIOXON® 330/301 was then applied to a thickness of about 2 to 3 tenths of a mil (about 5 to 7.5 micrometers), air dried at ambient conditions for approximately 30 minutes and baked at about 150° C. for about 30 minutes. Subsequently, the primed belt was provided with a coating of a Volume Graft fluoroelastomer which was prepared by dissolving approximately 250 grams of VITON® GF in about 2.5 liters of methylethyl ketone (MEK) by stirring at room temperature. This was accomplished by using a 4 liter plastic bottle and a moving base shaker for about one hour to two hours to accomplish the dissolution. The time needed for dissolving depended upon the speed of the shaker. The above solution was then transferred to a 5 liter Erlenmeyer flask and about 25 milliliters of the amine dehydrofluorinating agent, 3-(N-strylmethyl-2-aminoethylamino) propyltrimethoxysilane hydrochloride (S-1590, available from Huls America Inc. Piscataway, N.J.) was added. The contents of the flask were then stirred using a mechanical stirrer while maintaining the temperature between approximately 55 to 60° C. After stirring for about 30 minutes, approximately 50 milliliters of 100 centistoke vinyl terminated polysiloxane (PS-441 also available from Huls America Inc.) was added and stirring was continued for about another ten minutes. A solution of 10 grams of benzoyl peroxide in a 100 milliliter mixture of toluene and MEK (80:20) was then added. The stirring was continued while heating the contents of the flask at about 55° C. for another 2 hours.

During this time, the color of the solution turned light yellow. The solution was then poured into an open tray. The tray was left in the hood overnight (about 16 hours). The resulting yellow rubbery mass left after the evaporation of the solvent was then cut into small pieces with scissors. This material was then extracted extensively and repeatedly with 1,500 milliliters (three 500 milliliter portions) of n-hexane to remove unreacted siloxane. Thereafter, about 54.5 grams of the prepared silicone grafted fluoroelastomer, together with approximately 495 grams of methyl isobutyl ketone, 1.1 grams of magnesium oxide and 0.55 gram of calcium hydroxide $(CaOH)_2$ were added to a jar containing ceramic balls followed by roll milling for (media) 17 to 24 hours until a fine, 3 to 5 microns in diameter particle size of the fillers in dispersion was obtained. Subsequently, about 2.5 grams of DuPont CURATIVE VC50 catalyst crosslinker in 22.5 parts of methyl ethyl ketone were added to the above dispersion, shaken for about 15 minutes and the solids content reduced to around 5 to 7 percent by the addition of methyl isobutyl ketone.

Following hand mixing, the mixture was air sprayed onto the above primed belt to a dry thickness of about 4.5 mils, and cured in ambient dry air for about 24 hours followed by a post step curing procedure involving heating for 2 hours at 93° C., heating for 2 hours at 149° C., heating for 2 hours at 177° C., and thereafter heating for 16 hours at 208° C., followed by cooling.

The resulting belt included stainless steel as the substrate and volume graft derived from VITON® GF and vinyl terminated polydimethyl siloxane as an overcoat.

Example 4

Preparation of Volume Graft Outer Layer Using Ethoxy Terminated

An aminosilane-coupled, polyorganosiloxane fluoroelastomer composition was prepared as follows. A stock solution of VITON® GF obtained from DuPont was prepared by dissolving 250 grams of VITON® GF in 2.5 liters of methylethyl ketone (MEK) with stirring at room temperature for 1 to 2 hours. A four liter plastic bottle and a moving base shaker were used to prepare the stock solution. The above solution was then transferred to a four liter Edenmeyer flask and about 25 ml of the amine dehydrofluorinating agent, N-(2-aminoethyl-3-aminopropyl)-trimethoxysilane (AO700) was added.

The contents of the flask were then stirred using a mechanical stirrer while maintaining the temperature between 55 and 60° C. After stirring for about 30 minutes, 12.5 grams of ethoxy terminated polysiloxane (PS 393 available from Huls America Inc.), was added and stirring continued for another 5 minutes. About 25 grams of concentrated aqueous acetic acid catalyst was then added. Stirring was continued while heating the contents of the flask at around 65° C. for another approximate 4 hours. During this time, the color of the solution turned light yellow.

The above yellow solution was then cooled to room temperature. To the solution was added 5 grams of magnesium oxide, 2.5 grams of calcium hydroxide and 12.5 grams of curative VC-50 available from Dow Chemical Co. The above contents were then ball milled with ceramic balls as milling media for around 17 hours. The solution was then diluted to about 5 liters with MEK.

This dispersion was then spray coated onto a stainless steel belt (3 mL thick) and air-dried. The belt was then thermally cured by the following heating procedure: 2 hours at 93° C., 2 hours at 149° C., 2 hours at 177° C., and thereafter heating for 16 hours at 208° C. The thickness of the cured film as determined by permoscope was found to be about 4 mils.

The resulting belt was comprised of stainless steel as substrate and Volume Graft derived from VITON® GF and ethoxy terminated polydimethyl siloxane as an overcoat.

Example 5

Preparation of Volume Graft Outer Layer Using Hydride Terminated Polysiloxane The substrate was prepared as follows. An aluminum cylindrical sleeve was abraded with sand paper, followed by degreasing, scrubbing with an abrasive cleaner and thoroughly washing with water. Dow Coming primer DC1200 was applied to a thickness of around 2 to 3 tenths of a mil (5 to 7.5 micrometer), air dried at ambient conditions for about 30 minutes and baked at approximately 150° C. for about 30 minutes. Subsequently, the primed core was provided with an intermediate layer of a liquid injection molded silicone elastomer by molding Dow Coming LSR590 to the primed core to a thickness of about 0.25 inches. The silicone elastomer was cured for 10–15 minutes at 150° C. but was not post cured.

The outer layer was prepared as follows. Part A was prepared by dissolving about 500 g of VITON® GF in 5 liters of methylethyl ketone (MEK) by stirring at room temperature as set forth above. The solution was then transferred to a 10 liter Erlenmyer flask and 50 ml of the amine dehydrofluorinating agent, N-(2-aminoethyl)-3-amino propyltrimethoxysilane hydrochloride, available from Huls America Inc. Piscataway, N.J.) was added. The contents of the flask were then stirred using a mechanical stirrer while maintaining the temperature between 55 and 60° C. After stirring for about 30 minutes, 100 ml of 100 centistoke hydride functionally terminated polysiloxane (PS-545, a hydride terminated polydimethyl siloxane plus chloroplatinic acid catalyst, both available from Huls America Inc.) were added and the stirring continued while heating the contents of the flask around 75° C. for another 6 hours. During this time the color of the solution turned light yellow which then was cooled to room temperature. To this solution was then added 10 grams of magnesium oxide, 5 grams of calcium hydroxide and 25 grams of curative VC-50 available from Dow Chemical Co. The above mixture was then ball jarred with ceramic balls as media for 17 hours. The mixture was diluted to 12 liters with methylethyl ketone.

A portion of this dispersion (less than 5 liters) was spray coated onto a stainless steel belt (approximately 3 ml thick). The coating was then air-dried followed by curing using the step heat procedure of Example 4. The thickness of the cured film as determined by permoscope was found to be about 8 mils.

The resulting belt was comprised of stainless steel as substrate and Volume Graft derived from VITON® GF and hydride terminated polydimethyl siloxane as an overcoat.

Example 6

Preparation of Volume Grafted Transfix Belts

The volume graft overcoated belts of Example 3, 4 and 5 above were then placed in a two-belt, dry-development, transfuse fixture. The belt temperatures were maintained at about 120° C. It was observed that about 98 to 100 percent of the toner was transferred from each belt to the paper. On repeated cycling, the toner transfer efficiency did not degrade indicating that these Volume Graft belts would have extended release life for a viable product.

Example 7

Preparation of Titamer Outer Layer

A stainless steel belt (about 3 mils thickness) was abraded with sand paper, then degreased, scrubbed with an abrasive cleaner, and thoroughly washed with water. An epoxy primer THIOXON 330/301 was then applied to a thickness of about 2 to 3 tenths of a mil (5 to 7.5 micrometers), air-dried at ambient conditions for about 30 minutes and baked at 150°

C. for about 30 minutes. Subsequently, the primed belt was provided with a coating of a Titamer which was prepared as follows.

To prepare the Titamer, a stock solution of VITON® GF was prepared by dissolving about 250 g of VITON® GF in about 2.5 liters of methylethyl ketone (MEK) with stirring at room temperature as set forth in the above examples. The above solution was then transferred to a four liter Erlenmeyer flask and 25 ml of the amine dehydrofluorinating agent, N-2-aminoethyl-3-aminopropyltrimethoxy-silane, (available as A0700 from Huls America Inc.) was added. The contents of the flask were then stirred using a mechanical stirrer while maintaining the temperature as in the above examples. After stirring for about 30 minutes, approximately 62.5 grams of titanium isobutoxide (about 25% by weight based on weight of VITON® GF), available from Huls America Inc., was added and stirring continued for another five minutes. About 25 grams of acetic acid was then added. The stirring was continued while the contents of the flask were heated at around 65° C. for another 4 hours. During this time the color of the solution turned light yellow. The above yellow solution was then cooled to room temperature. To the above solution was then added 5 grams of magnesium oxide, 2.5 grams of calcium hydroxide and 12.5 grams of E.I. DuPont CURATIVE VC50. The above contents were then ball jarred with ceramic balls as media for about 17 hours. The solution was then diluted to about 5 liters with MEK. This dispersion was then spray coated onto the above primed belt to a dry thickness of about 6 mils to result in a belt overcoated with a Titamer composition. The dry Titamer film was then cured by the following heating procedure: 2 hours at 93° C., 2 hours at 149° C., 2 hours at 177° C., and thereafter heating for 16 hours at 208° C. The thickness of the cured Titamer film as determined by permoscope was found to be about 4 mils.

Example 8

Preparation of Grafted Titamer Outer Layer

A stainless steel belt having the same dimensions as in Example 7 was abraded with sand paper, then: degreased, scrubbed with an abrasive cleaner, and thoroughly washed with water. An epoxy primer THIOXON 330/301 was then applied to a thickness of 2 to 3 tenths of a mil (5 to 7.5 micrometers), air dried at ambient conditions for 30 minutes and baked at 150° C. for about 30 minutes. Subsequently, the primed belt was provided with a coating of a Grafted Titamer.

A Grafted Titamer composition was prepared by dissolving about 250 g of VITON® GF in 2.5 liters of methylethyl ketone (MEK) by stirring at room temperature. This is accomplished as set forth in Example 7. The above solution was then transferred to a four liter Erlenmeyer flask and 25 mil of the amine dehydrofluorinating agent, 3-(N-strylmethyl-2-aminoethylamino) propyltrimethoxysilane hydrochloride (S-1590, available from Huls America Inc.) was added. The contents of the flask were then stirred using a mechanical stirrer while maintaining the temperature between 55 and 60° C. After stirring for about 30 minutes, 50 grams of ethoxy terminated polysiloxane (PS-393) and 50 grams of titanium isobutoxide both available from Huls America Inc. were added and stirring continued for another ten minutes. About 25 grams of acetic acid was then added. The stirring was continued while heating the contents of the flask at around 55° C. for another 4 hours. During this time the color of the solution turned light brown which then cooled to room temperature.

To this solution was then added 5 grams of magnesium oxide, 2.5 grams of calcium hydroxide and 12.5 grams of E.I. DuPont CURATIVE VC50. The above mixture was then ball jarred with ceramic balls as media for about 17 hours. The mixture was diluted to 5 liters with methylethyl ketone. Next, a portion of the above dispersion was sprayed to a dry thickness of 6.5 mils onto the above belt to result in a belt overcoated with a Grafted Titamer composition. The resulting belt was then cured by the curing profile set forth in Example 7. The belt was then cooled to room temperature. The thickness of the cured Grafted Titamer film as determined by permoscope was found to be 4.2 mils.

Example 9

Preparation of Titamer and Grafted Titamer Transfix Members

The Titamer and Grafted Titamer overcoated belts of Examples 7 and 8 were then placed in two-belt, dry-development, transfuse fixtures. This fixture was modified to apply low levels of release fluids. The belt temperature was maintained at about 120° C. and amino functional polyorganosiloxane oil was used as release fluid. It was observed that about 95 to 98 percent of the toner was transferred from these belts to the paper. On repeated cycling, the toner transfer efficiency did not degrade indicating that these belts would have extended release life for viable products.

Example 10

Preparation of Ceramer Outer Layer

A stainless steel belt (12 inches wide×36 inches long×2 mils thick) was abraded with sand paper, then degreased, scrubbed with an abrasive cleaner, and thoroughly washed with water. An epoxy primer THIOXON 330/301 was then applied to a thickness of about 2 to 3 tenths of a mil (5 to 7.5 micrometers), air dried at ambient conditions for about 30 minutes and baked at approximately 150° C. for about 30 minutes.

Subsequently, the primed belt was provided with a coating of a Ceramer which was prepared as follows. A stock solution of VITON® GF was prepared by dissolving about 250 g of VITON® GF in 2.65 liters of methylethyl ketone (MEK) with stirring at room temperature. A four liter plastic bottle and a moving base shaker were used to prepare the stock solution. The mixture was dissolved for approximately 1 to 2 hours. The above solution was then transferred to a four liter Erlenmeyer flask and about 25 ml of the amine dehydrofluorinating agent, 3-(N-strylmethyl-2-aminoethylamino)-propyltrimethoxysilane hydrochloride (S-1590, available from Huls America Inc.) was added. The contents of the flask were then stirred using a mechanical stirrer while maintaining the temperature between 55 to 60° C. After stirring for about 30 minutes, approximately 12.5 grams of tetraethoxyorthosilicate (TEOS, available from Huls America Inc.) was added and stirring continued for another five minutes. About 25 grams of acetic acid was then added. The stirring was continued while heating the contents of the flask to about 65° C. for another 4 hours. During this time the color of the solution turned light yellow.

The above yellow solution was then cooled to room temperature, and about 5 grams of magnesium oxide, 2.5 grams of calcium hydroxide, and 12.5 grams of E.I. DuPont CURATIVE VC50 were added. The above contents were then ball jarred with ceramic balls as media for 17 hours. The solution was then diluted to about 5 liters with MEK.

This dispersion was then spray coated onto the above primed belt to a dry thickness of 4.5 mils to result in a belt overcoated with a Ceramer composition. The overcoat was then cured by using the following heating procedure: 2 hours at 93° C., 2 hours at 149° C., 2 hours at 177° C., and thereafter heating for 16 hours at 208° C. The thickness of the cured film as determined by permoscope was found to be about 3 mils.

Example 11

Preparation of a Grafted Ceramer Overcoat

A stainless steel belt (2 mils thick) having the same dimensions as in Example 10 was abraded with sand paper, then degreased, scrubbed with an abrasive cleaner, and thoroughly washbed with water. An epoxy primer THIOXON 330/301 was then applied to a thickness of 2 to 3 tenths of a mil (5 to 7.5 micrometers), air dried at ambient conditions for 30 minutes and baked at 150° C. for 30 minutes.

Subsequently, the primed belt was provided with a coating of a Grafted Ceramer, which was prepared as follows. A Grafted Ceramer composition was prepared by dissolving 250 g of VITON® GF in 2.5 liters of methylethyl ketone (MEK) by stirring at room temperature. This is accomplished by using a four liter plastic bottle and a moving base shaker and dissolving as set forth in Example 10. The above solution was then transferred to a four liter Erlenmeyer flask and about 25 mil of the amine dehydrofluorinating agent, 3-(N-strylmethyl-2-aminoethylamino) propyltrimethoxysilane hydrochloride (S-1590, available from Huls America Inc.) was added. The contents of the flask were then stirred using a mechanical stirrer while maintaining the temperature between 55 and 60° C. After stirring for about 30 minutes, 50 grams of ethoxy terminated polysiloxane (PS-393) and 50 grams of tetraethoxyorthosilicate both available from Huls America Inc., were added and stirring continued for another ten minutes. About 25 grams of acetic acid was then added. The stirring was continued while heating the contents of the flask at around 55° C. for another 4 hours. During this time, the color of the solution turned light brown which then cooled to room temperature.

To this solution was then added 5 grams of magnesium oxide; 2.5 grams of calcium hydroxide and 12.5 grams of E.I. DuPont CURATIVE VC50. The above mixture was then ball jarred with ceramic balls as media for 17 hours. The mixture was diluted to 5 liters with methylethyl ketone. A portion of this dispersion (less than 2 liters) was spray coated onto the above primed belt to a dry thickness of 4.5 mils to result in a belt overcoated with a Grafted Ceramer composition. The overcoat was cured by the heating procedure set forth in Example 10. The thickness of the cured film as determined by permoscope was found to be about 3 mils.

Example 12

Preparation of Ceramer and Grafted Ceramer Transfix Belts

The Ceramer and Grafted Ceramer overcoated belts of Examples 10 and 11 were placed in a two-belt, dry-development, transfuse fixture. This fixture was modified to apply low levels of release fluids. The belt temperature was maintained at about 120° C. and amino functional polyorganosiloxane oil was used as release fluid. It was observed that approximately 100 percent of the toner was transferred from this belt to the paper. On repeated cycling, the toner transfer efficiency did not degrade indicating that this belt would have extended release life for a viable product.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. An image forming apparatus for forming images on a recording medium comprising:

a) a charge-retentive surface to receive an electrostatic latent image thereon;

b) a development component to apply a developer material to said charge-retentive surface to develop said electrostatic latent image to form a developed image on said charge-retentive surface;

c) a transfer component for transferring said developed image from said charge-retentive surface to an intermediate transfer component;

d) an intermediate transfer component for receiving said developed image from said transfer component and transferring said developed image to a transfix component; and e) a transfix component to transfer the developed image from said intermediate transfer component to a copy substrate and to fix said developed image to said copy substrate, said transfix component comprising:

i) a transfix substrate, and thereover ii) an outer coating comprising a haloelastomer consisting essentially of the reaction product monomers selected from the group consisting of halogenated monomers, polyorganosiloxane monomers, and mixtures thereof, and iii) a heating member associated with said transfix substrate.

2. The image forming apparatus of claim 1, wherein said haloelastomer consists essentially of halogen monomers.

3. The image forming apparatus of claim 2, wherein said haloelastomer is selected from the group consisting of a) copolymers of vinylidenefluoride, hexafluoropropylene, and tetrafluoroethylene, b) terpolymers of vinylidenefluoride, hexafluoropropylene and tetrafluoroethylene, and c) tetrapolymers of vinylidenefluoride, hexafluoropropylene, tetrafluoroethylene, and a cure site monomer.

4. The image forming apparatus of claim 3, wherein said haloelastomer consists essentially of 35 weight percent of vinylidenefluoride, 34 weight percent of hexafluoropropylene, 29 weight percent of tetrafluoroethylene, and 2 weight percent cure site monomer.

5. The image forming apparatus of claim 1, wherein said haloelastomer consists essentially of polyorganosiloxane monomers and halogenated monomers.

6. The image forming apparatus of claim 5, wherein said haloelastomer is selected from the group consisting of volume grafted fluoroelastomers, ceramers, grafted ceramers, titamers and grafted titamers.

7. The image forming apparatus of claim 1, wherein said haloelastomer comprises polyorganosiloxane monomers.

8. The image forming apparatus of claim 7, wherein said haloelastomer comprises an additional monomer capable of reacting with said polyorganosiloxane monomer to form a polyorganosiloxane copolymer.

9. The image forming apparatus of claim 8, wherein said polyorganosiloxane copolymer is selected from the group consisting of polyamide polyorganosiloxane copolymers, polyimide polyorganosiloxane copolymers, polyester polyorganosiloxane copolymers, polysulfone polyorganosiloxane copolymers, polystyrene polyorganosiloxane copolymers, polypropylene polyorganosiloxane copolymers, and polyester polyorganosiloxane copolymers.

10. The image forming apparatus of claim 1, wherein said outer coating further comprises a conductive filler.

11. The image forming apparatus of claim 10, wherein said conductive filler is selected from the group consisting of metals, metal oxides, carbon blacks, conductive polymers, and mixtures thereof.

12. The image forming apparatus of claim 11, wherein said conductive filler is selected from the group consisting of indium tin oxide, carbon black, and a mixture of indium tin oxide and carbon black.

13. The image forming apparatus of claim 1, wherein said transfix substrate comprises a metal.

14. The image forming apparatus of claim 1, wherein said transfix substrate comprises a fabric material.

15. The image forming apparatus of claim 14, wherein said fabric material is selected from the group consisting of nonwoven cotton fabric, graphite fabric, fiberglass, woven polyimide, nonwoven polyimide, woven polyamide, nonwoven polyamide, polyester, aramids, polycarbonate, polyacryl, polystyrene, polyethylene, polypropylene, cellulose, polysulfone, polyxylene, polyacetal, and mixtures thereof.

16. The image forming apparatus of claim 1, wherein an intermediate layer is positioned between said substrate and said outer coating.

17. The image forming apparatus of claim 16, wherein said intermediate layer comprises a silicone material.

18. The image forming apparatus of claim 16, wherein said intermediate layer comprises a conductive filler.

19. The image forming apparatus of claim 18, wherein said conductive filler is selected from the group consisting of carbon blacks, metal oxides, metals, conductive polymers, and mixtures thereof.

20. An image forming apparatus for forming images on a recording medium comprising:

a) a charge-retentive surface to receive an electrostatic latent image thereon;

b) a development component to apply a developer material to said charge-retentive surface to develop said electrostatic latent image to form a developed image on said charge-retentive surface;

c) a transfer component for transferring said developed image from said charge-retentive surface to an intermediate transfer component;

d) an intermediate transfer component for receiving said developed image from said transfer component and transferring said developed image to a transfix component; and e) a transfix component to transfer the developed image from said intermediate transfer component to a copy substrate and to fix said developed image to said copy substrate, said transfix component comprising:

i) a transfix substrate comprising a material selected from the group consisting of fabric and metal, and thereover ii) an outer coating comprising a haloelastomer consisting essentially of the reaction product monomers selected from the group consisting of halogenated monomers, polyorganosiloxane monomers and mixtures thereof, and iii) a heating member associated with said transfix substrate.

* * * * *